(12) United States Patent
Hoelzel

(10) Patent No.: US 10,369,871 B2
(45) Date of Patent: Aug. 6, 2019

(54) FRAME OF A VEHICLE ROOF AND PRODUCTION THEREOF

(71) Applicant: Webasto SE, Stockdorf (DE)

(72) Inventor: Dominik Hoelzel, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 66 days.

(21) Appl. No.: 15/526,266

(22) PCT Filed: Oct. 6, 2015

(86) PCT No.: PCT/EP2015/073020
§ 371 (c)(1),
(2) Date: May 11, 2017

(87) PCT Pub. No.: WO2016/078821
PCT Pub. Date: May 26, 2016

(65) Prior Publication Data
US 2017/0313168 A1    Nov. 2, 2017

(30) Foreign Application Priority Data

Nov. 21, 2015 (DE) ........................ 10 2014 117 049

(51) Int. Cl.
*B60J 7/043* (2006.01)
*B29C 44/12* (2006.01)
(Continued)

(52) U.S. Cl.
CPC ........... *B60J 7/043* (2013.01); *B29C 44/1228* (2013.01); *B60J 7/022* (2013.01); *B60J 10/30* (2016.02);
(Continued)

(58) Field of Classification Search
CPC ... B60J 7/043; B60J 7/022; B60J 10/30; B60J 10/08; B62D 25/06; B62D 27/026;
(Continued)

(56) References Cited

U.S. PATENT DOCUMENTS

| | | |
|---|---|---|
| 5,104,178 A | 4/1992 | Bienert |
| 2003/0085595 A1 | 5/2003 | Dunzinger et al. |
| 2008/0073943 A1 | 3/2008 | Pollak et al. |

FOREIGN PATENT DOCUMENTS

| | | |
|---|---|---|
| DE | 40 14 487 C1 | 8/1991 |
| DE | 196 41 462 A1 | 4/1998 |

(Continued)

OTHER PUBLICATIONS

International Preliminary Report on Patentability for corresponding PCT/EP2015/073020 dated May 23, 2017.
(Continued)

*Primary Examiner* — D Glenn Dayoan
*Assistant Examiner* — Melissa A Black
(74) *Attorney, Agent, or Firm* — Fitch, Even, Tabin & Flannery, LLP

(57) ABSTRACT

The invention relates to a frame, comprising, on each of its two sides relative to a vertical longitudinal center plane of the roof, a respective longitudinal beam made of sheet metal and at least one transverse beam made of sheet metal and connecting the two longitudinal beams to each other. The longitudinal beams and the at least one transverse beam are connected to each other via joint lines made of polyurethane foam. Moreover, a method for producing the frame is proposed.

21 Claims, 9 Drawing Sheets

(51) Int. Cl.
   *B62D 29/00* (2006.01)
   *B60J 10/30* (2016.01)
   *B60J 10/84* (2016.01)
   *B62D 27/02* (2006.01)
   *B62D 25/06* (2006.01)
   *B60J 7/02* (2006.01)
   B29K 105/04 (2006.01)
   B29K 75/00 (2006.01)
   B29K 705/12 (2006.01)
   B29L 31/30 (2006.01)

(52) U.S. Cl.
   CPC .............. *B60J 10/84* (2016.02); *B62D 25/06* (2013.01); *B62D 27/026* (2013.01); *B62D 29/002* (2013.01); *B29K 2075/00* (2013.01); *B29K 2105/04* (2013.01); *B29K 2705/12* (2013.01); *B29L 2031/3002* (2013.01)

(58) Field of Classification Search
   CPC ......... B29C 44/1228; B29L 2031/3002; B29K 2075/00; B29K 2105/04; B29K 2705/12
   See application file for complete search history.

(56) References Cited

FOREIGN PATENT DOCUMENTS

| | | |
|---|---|---|
| DE | 198 21 694 A1 | 11/1999 |
| DE | 10 2006 046 122 A1 | 3/2008 |
| EP | 1 302 352 A1 | 4/2003 |
| EP | 1 914 097 A2 | 4/2008 |

OTHER PUBLICATIONS

International Search Report for PCT/JP2015/084038 dated Feb. 2, 2016; English translation submitted herewith (5 pages).

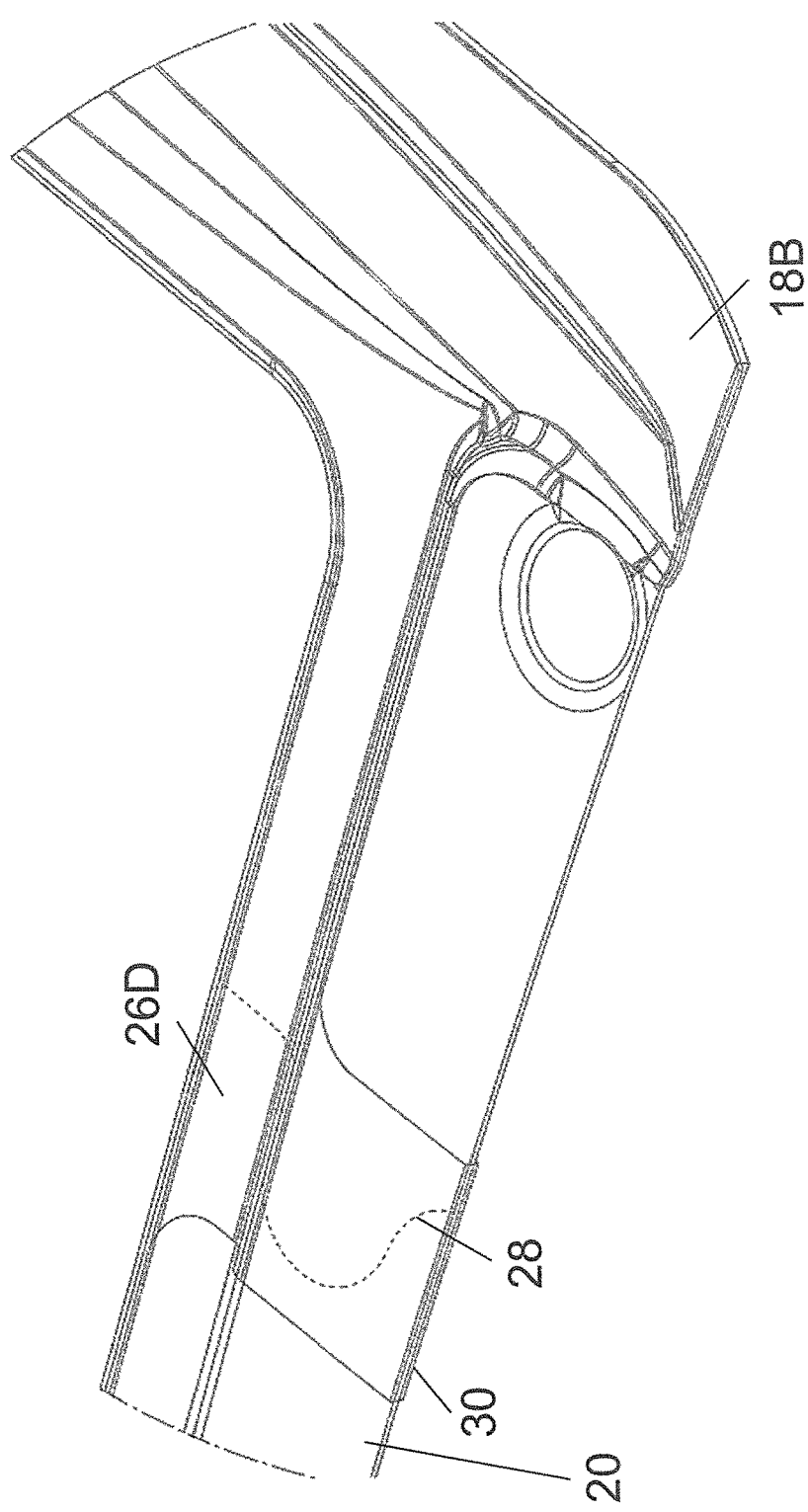

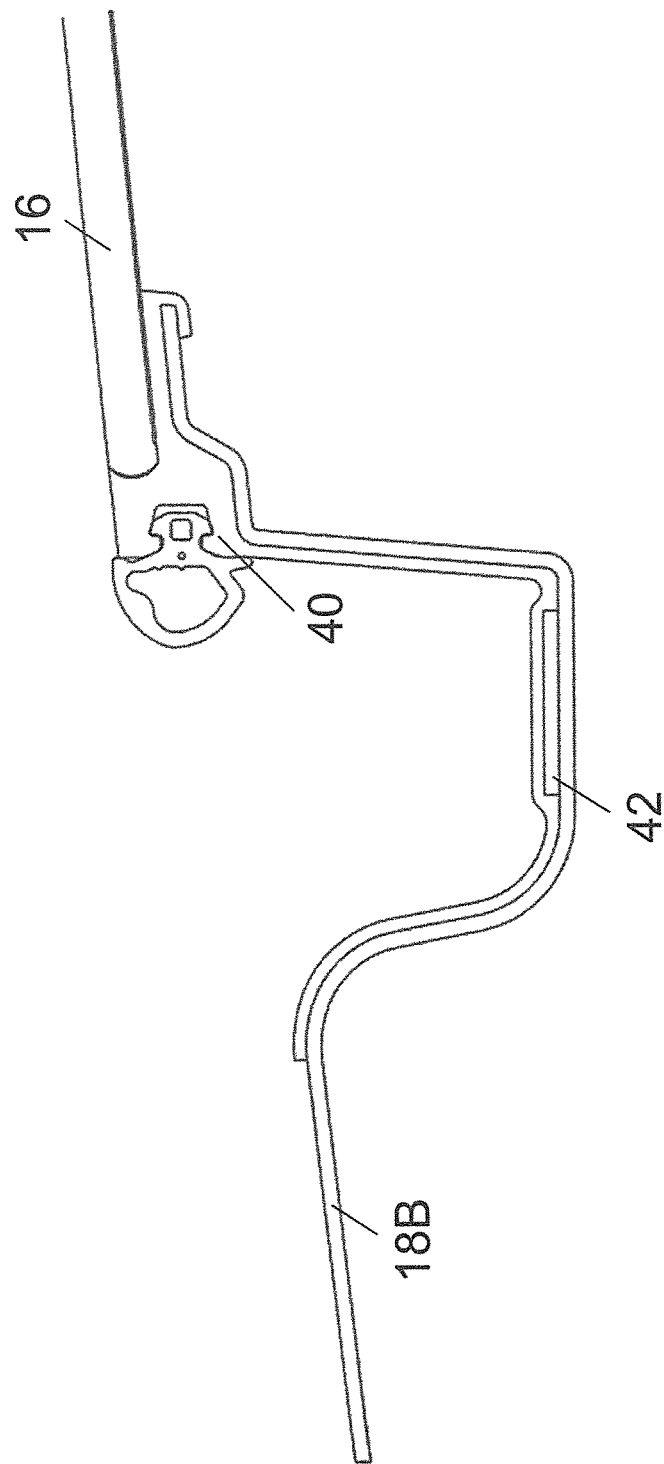

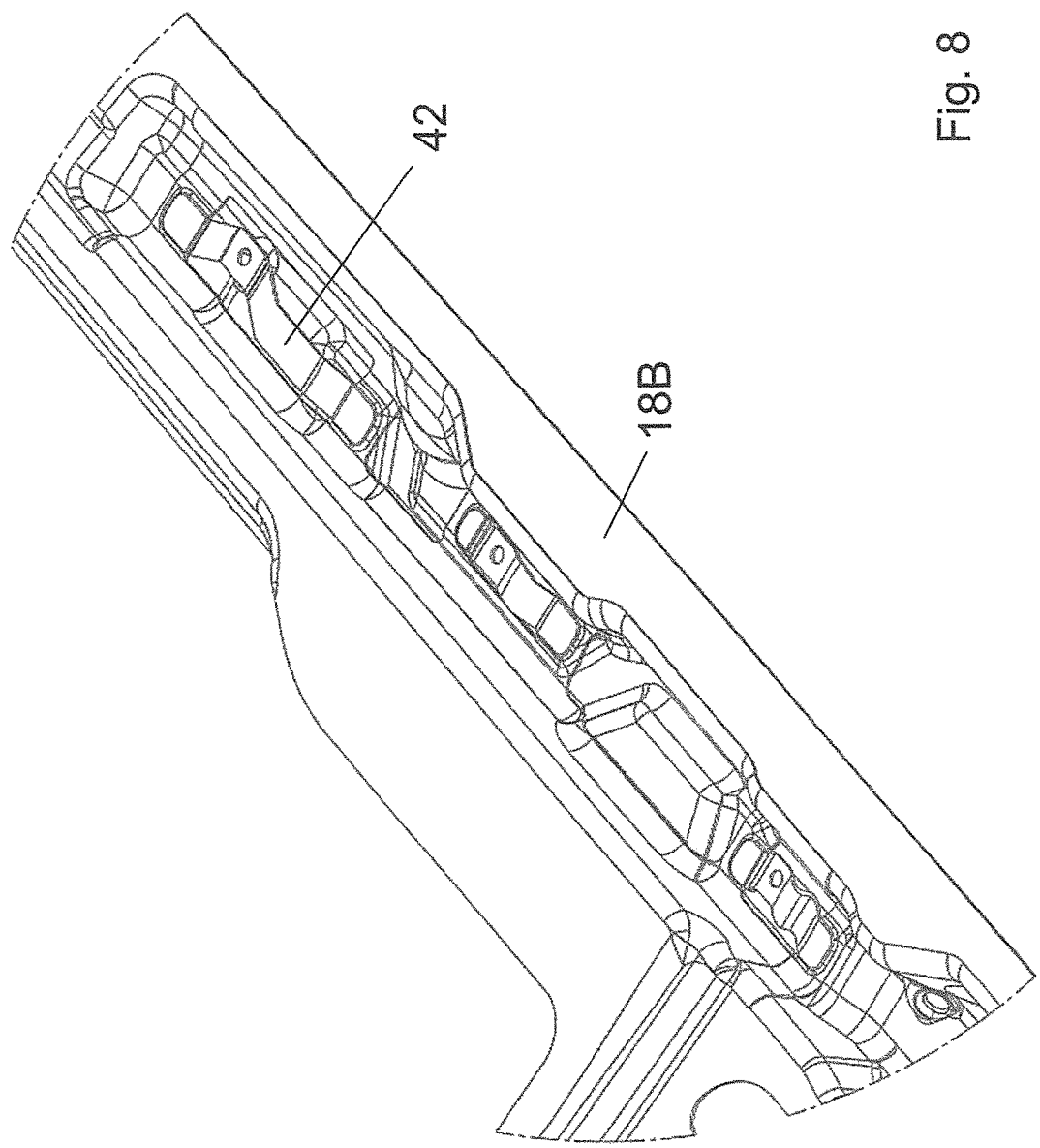

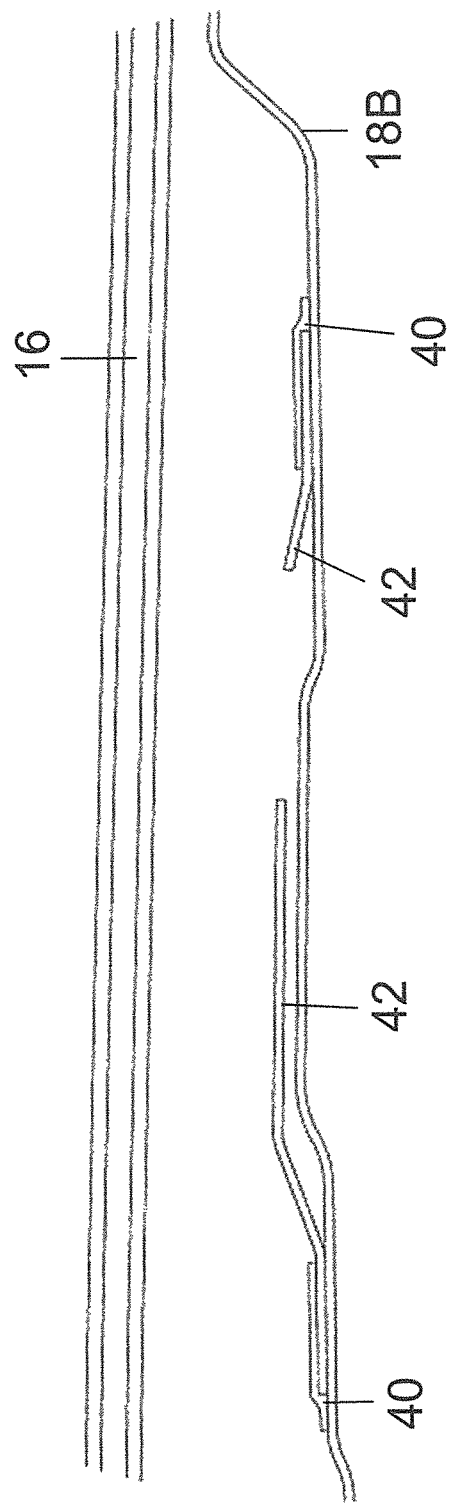

FRAME OF A VEHICLE ROOF AND PRODUCTION THEREOF

The invention relates to a frame of a vehicle roof having the features of the preamble of claim 1 as well as to a method for producing this frame.

Such a frame is known from practice and is a frame of a sliding roof arrangement, for example, which comprises a lid element, by means of which a roof opening of a vehicle roof can be closed or at least partially opened as desired. The frame, which can be inserted into the vehicle roof, receives building components of the sliding roof arrangement, which are required for displacing the lid element. In particular, these building components are composed of a driving motor, guide tracks and other kinematic building components. Moreover, a roof panel can be glued onto the frame, said roof panel being mounted permanently in regard of the vehicle body, being transparent in particular and limiting the roof opening at the rear of the car.

Frames known so far of the make described above are often produced of steel sheet metal and comprise a main frame, which limits large openings. The main frame is made in one piece as a so-called stamped or bending part so that during production approximately one half of the used material has to be disposed of as waste or be reintroduced into a material cycle. Fixtures and panels, which visually upgrade the visible surfaces of the frame, are generally connected to the frame via an adhesion method. Furthermore, it is necessary to apply a cathodically electrodeposited thick film onto the steel sheet metal. This also increases production costs.

The object of the invention is to create a frame of the make mentioned above, whose production is possible in a more economical way.

The object of the invention is attained by the frame having the features of claim 1.

The basic concept of the invention is, amongst other things, that individual sheet-metal parts of a vehicle roof frame are jointed together via a polyurethane foaming, which forms the joint lines. It is possible to produce the individual sheet-metal parts of the frame according to a stamping and bending process using much less material in order to subsequently connect sheet-metal parts to each other via a polyurethane foaming in a manner according to the invention. In the broadest sense, the sheet-metal parts are to be considered as inserts in the foam molding process for producing the joint lines.

A producer of frames can thus provide a modular construction system, the longitudinal beams and the transverse beam(s) being able to be used for various frames and be chosen and joined in dependence of the vehicle type.

The frame according to the invention is in particular a frame of a roof opening system having a displaceable lid element for opening and closing a roof opening as desired, said roof opening being at least partially surrounded by the frame. It is also conceivable for the frame to serve only for storing and securing rigid and in particular transparent roof panels.

In a specific embodiment consisting only of few components, the frame according to the invention comprises two longitudinal beams extending in the longitudinal direction of the roof and a transverse beam, which connects the two longitudinal beams to each other at their front ends, thus forming a front part of the frame. More often than not, however, the frame according to the invention will comprise at least two transverse beams in practice, one of which will form the front part of the frame and the other of which will form the back part of the frame. Moreover, another transverse beam can be provided, which connects the two longitudinal beams in a middle section as a type of middle crosspiece and separates two transparent, if applicable, roof cutouts from each other.

Abutting areas can be realized between the longitudinal beams and the at least one transverse beam, said abutting areas being formed either straight or curved. The abutting areas are surrounded by the polyurethane foam forming the joint lines. The stability of the frame is increased via the curved or meandering form of the abutting areas.

It is also conceivable for the transverse beam and the two longitudinal beams to overlap in the area of the joint lines formed by the polyurethane foam, which can also increase the rigidity or rather the stability of the frame.

In a specific embodiment, the frame according to the invention can comprise a functional section, said functional section being formed by polyurethane foam and connected to at least one of the longitudinal beams and/or the at least one transverse beam.

In the scope of the invention, a functional section is to be understood as a frame section made of polyurethane foam, said frame section serving for mounting or holding, respectively, and securing or also storing building components necessary for its function. The functional section can only have concealing properties as well.

The functional section comprises, for example, a holding section for a seal of a roof opening system. The holding section can comprise a seal groove, into which the seal is inserted. By making the holding section of a polyurethane foam, the seal can be stably secured without any additional adhesive methods, as would be required when securing a seal to a sheet-metal part. The functional section can also serve for securing a reinforcing sheet on at least one of the longitudinal beams and/or on the at least one transverse beam. The reinforcing sheets surround the joining locations between the longitudinal beams and the at least one transverse beam, for example. Holding sheets can also be secured by means of the functional section, said holding sheets being necessary for securing further fixtures, such as guide tracks, or for securing the frame itself to the vehicle body in the sense of a dome.

A functional integration when producing the frame is possible via the at least one functional section of the frame according to the invention. No subsequent or separate steps are required for this purpose.

In another specific embodiment of the frame according to the invention, the functional section comprises a panel, which is formed on at least one of the longitudinal beams and/or on the at least one transverse beam. The panel can therefore be made of the polyurethane foam or be connected to the frame as a separate building component via a polyurethane foam forming the functional section, thus improving the appearance of the frame according to the invention.

Moreover, the frame according to the invention can comprise at least one visible surface, which is formed by a polyurethane foam connected to the transverse beam and/or to at least one of the longitudinal beams. The visible surface can comprise a smooth surface or a grain, which is formed in the polyurethane foam.

By forming visible surfaces out of polyurethane foam with or without a grain, qualitative surfaces can be generated, which increases the visual appearance of a frame.

In the frame according to the invention, edges of the transverse beam(s) made of sheet metal can be provided with a foaming around the edge so that a risk of corrosion at the edges is reduced in this area in particular. Thus, coating the surface of the sheet metal, in particular via cathodic electrodeposition, can be omitted where applicable or a thinner cathodic electrodeposited coating can be provided as compared to coating of the state of the art, which leads to a reduction of production costs.

According to a further aspect of the invention, a frame of a vehicle roof is proposed, said frame comprising a longitudinal beam, made of sheet metal, on each of its two sides relative to a vertical longitudinal center plane of the roof and at least one transverse beam connecting the two longitudinal beams to each other, said frame comprising at least one functional section, which is made of a polyurethane foam and is connected to at least one of the longitudinal beams and/or the transverse beam. The functional section is formed according to the functional sections described above, for example.

Moreover, according to a further aspect of the invention, a frame of a vehicle roof constitutes a part of the invention, said frame also comprising a longitudinal beam, made of sheet metal, on each of its two sides relative to a vertical longitudinal center plane of the roof and at least one transverse beam made of sheet metal and connecting the two longitudinal beams to each other, said frame comprising at least one visible surface, which is formed by a polyurethane foam connected to at least one of the longitudinal beams and/or the transverse beam.

In a specific embodiment of the frame according to the invention, both longitudinal beams support an in particular transparent roof panel, said roof panel being secured to each of the longitudinal beams via a polyurethane-foam molding section.

Furthermore, according to the invention, a method for producing a frame of a vehicle roof is proposed, said frame comprising a longitudinal beam, made of sheet metal, on each of its two sides relative to a vertical longitudinal center plane of the top and at least one transverse beam made of sheet metal and connecting the two longitudinal beams to each other. The longitudinal beams and the transverse beam are connected to each other via polyurethane foam according to a foam molding process under formation of joint lines in this method.

The method according to the invention can be produced using a foaming mold, in which the longitudinal beams and the transverse beam are inserted and in which the joint lines made of polyurethane foam are formed.

In the foam molding process, which can be carried out in several steps in several foaming molds if necessary, a functional section realized as described above and/or a visible surface realized as described above can be formed, which is/are tied to at least one of the longitudinal beams and/or to the transverse beam.

Further advantages and advantageous embodiments of the subject matter of the invention can be taken from the description, the drawing and the claims.

An exemplary embodiment of a frame according to the invention is shown in the drawing in a schematically simplified manner and is further explained in the following description. In the figures, FIG. 1 shows a perspective top view of a sliding roof frame having a glass panel secured thereto;

FIG. 6 shows an enlarged view of the area VI-VI in FIG. 1;

FIG. 7 shows a sectional view of the sliding roof frame along the line VII-VII in FIG. 1;

FIG. 8 shows an enlarged view of the area VIII-VIII in FIG. 2; and

FIG. 9 shows a sectional view of the sliding roof frame along the line IX-IX in FIG. 2.

Figure 1:
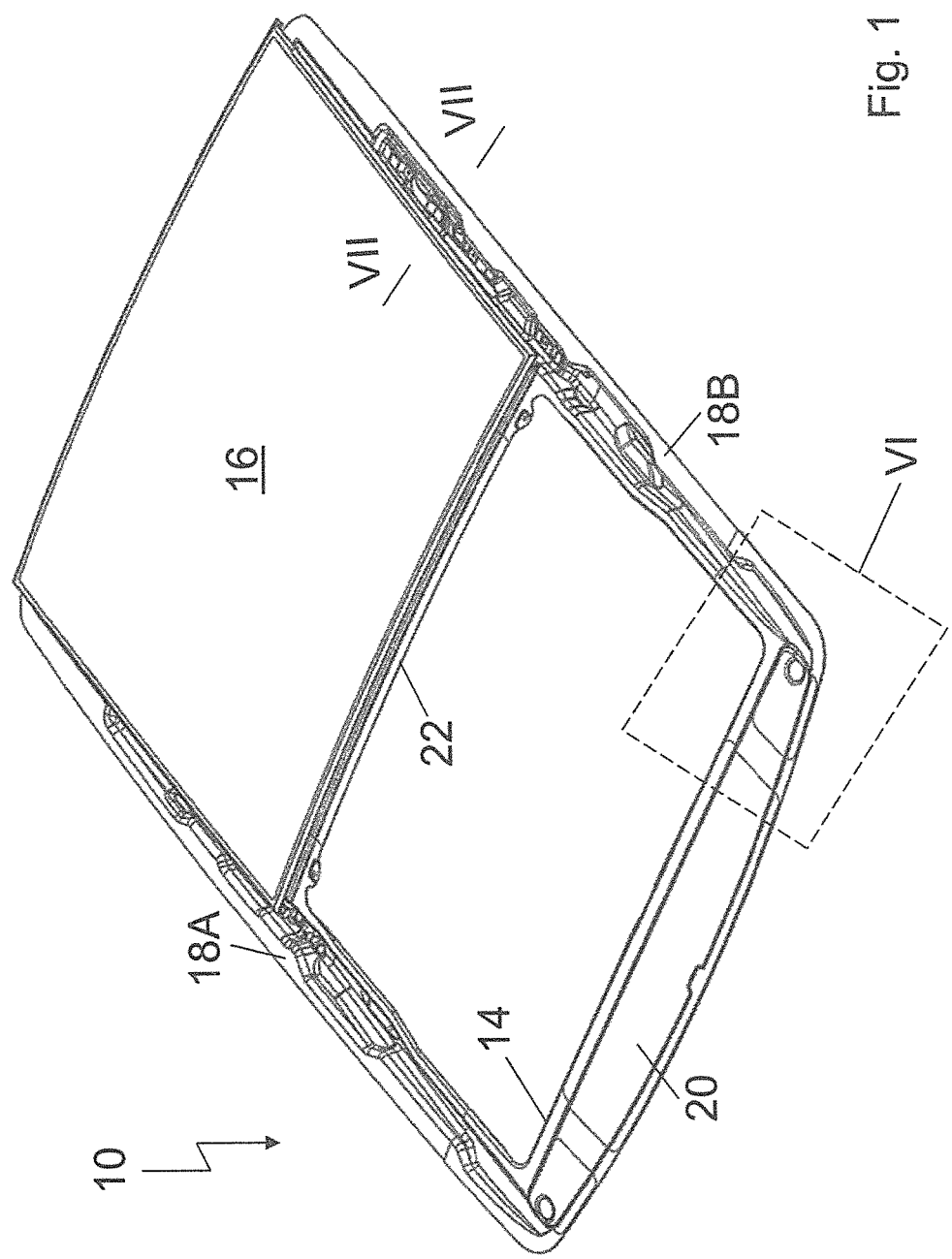

In the drawing, a frame 10 of a vehicle roof is shown, said frame being able to be installed in a corresponding passenger car and being allocated to a roof opening system not shown here. The roof opening system comprises a lid element 12 shown in FIGS. 4 and 5, by means of which a roof opening 14 defined by the frame 10 can be closed or at least partially opened as desired. When displacing the lid element 12, the lid element 12 can be raised upward with its rearward edge and be moved in the rearward direction of the vehicle via a hard top section formed by a glass panel 16. As can be seen in particular in FIGS. 2 to 4, the frame comprises two longitudinal beams or legs 18A and 18B, which are arranged on each of the two sides of the frame relative to a vertical longitudinal center plane of the roof and each extend in a longitudinal direction of the vehicle or roof, respectively. The longitudinal beams 18A and 18B are connected to each other via three transverse beams or legs 20, 22 and 24, which each extend in the transverse direction of the roof. The transverse beam 20 forms a front part of the frame, the transverse beam 24 forms a rear part of the frame and the transverse beam 22 forms a middle crossbeam of the frame 10.

The two longitudinal beams 18A and 18B and the transverse beams 20, 22 and 24 are each made of a stamped and bending part, which was produced in a corresponding tool. These five metal sheets are connected to each other via six joining areas 26A, 26B, 26C, 26D, 26E and 26F. As can be seen in FIG. 6, the longitudinal beams 18A and 18B rest against each other in the joining areas 26A and 26D, respectively, via a curved track following the abutting line 28, whereas the abutting line is straight in the joining areas 26B, 26C, 26E and 26F. The joining areas 26A to 26F are each made of a polyurethane coat 30 forming a joint line, said polyurethane coat 30 surrounding the corresponding abutting line from the upper side of the frame as well as from the lower side of the frame. The corresponding polyurethane layer or coating 30, respectively, also forms a casing of the frame 10 in the joining areas 26A to 26F. Moreover, the polyurethane coats 30 surround stamped edges of the longitudinal beams 18A and 18B and the transverse beams 20, 22 and 24, said stamped edges being present in the joining areas 26A to 26F, so that the risk of corrosion at the edges is minimized.

Figure 4:
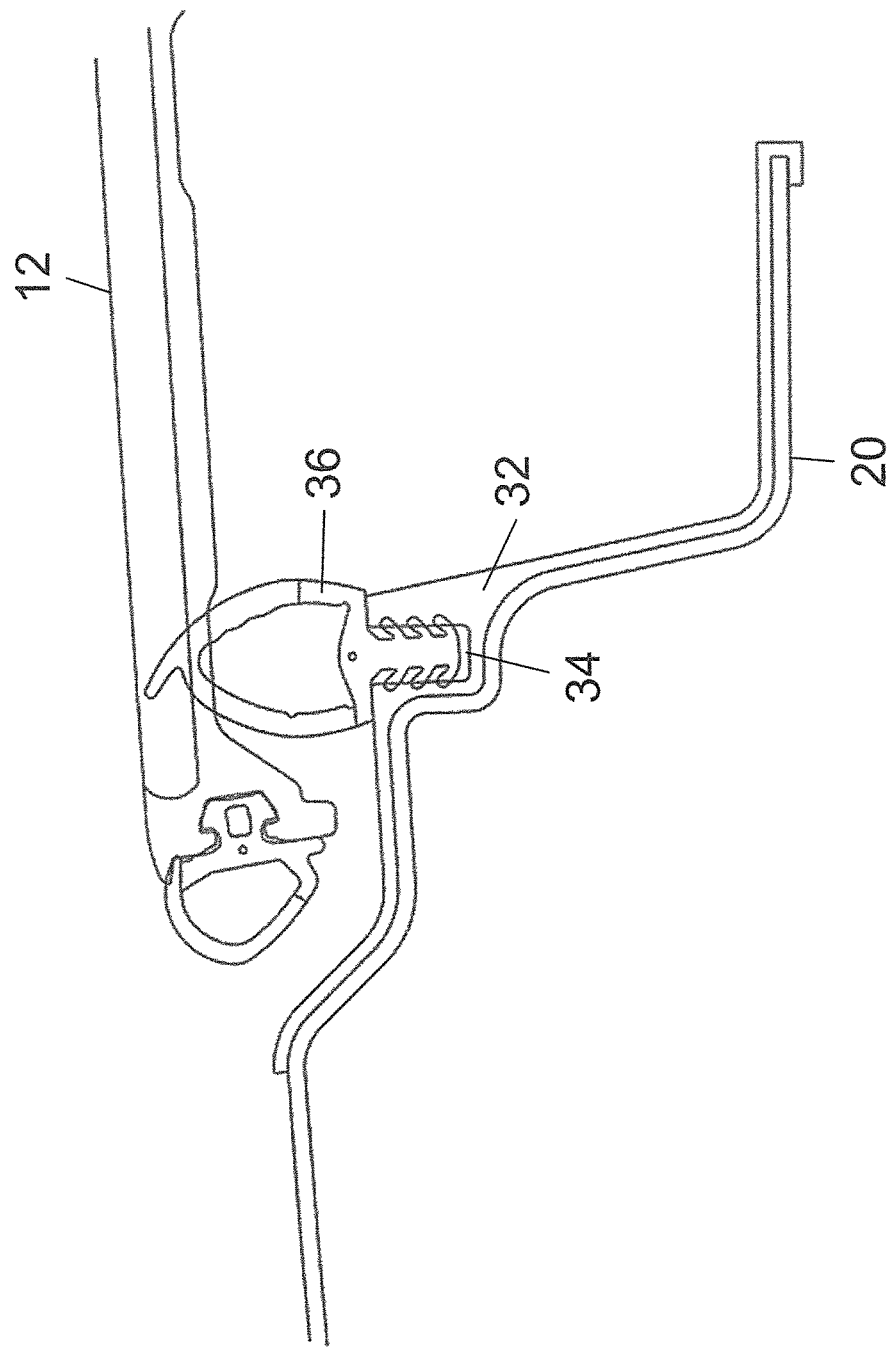
FIG. 4 shows a sectional view of the sliding roof frame according to FIG. 2 along the line IV-IV in FIG. 2, albeit in conjunction with a sliding roof element.

As can be seen in particular in FIG. 4, a screen 32 made of polyurethane foam is formed to the area of the transverse beam 20, which forms the front part of the frame, said screen 32 comprising a grained visible surface. The screen 32 is a functional section, which moreover serves as a holding section and comprises a seal groove 34, in which a lid seal 36 is inserted with its seal base, which is pine-shaped (ribbed) in its cross section. In the closed position of the lid element 12, the lid seal 36 seals a vehicle interior with respect to the vehicle environment.

As can also be seen in FIG. 4, the functional section forming the screen 32 surrounds the transverse beam 20 made of a sheet metal at its inwardly positioned edge relative to the roof opening 14. This, in turn, minimizes the risk of corrosion at the edge.

Figure 5:
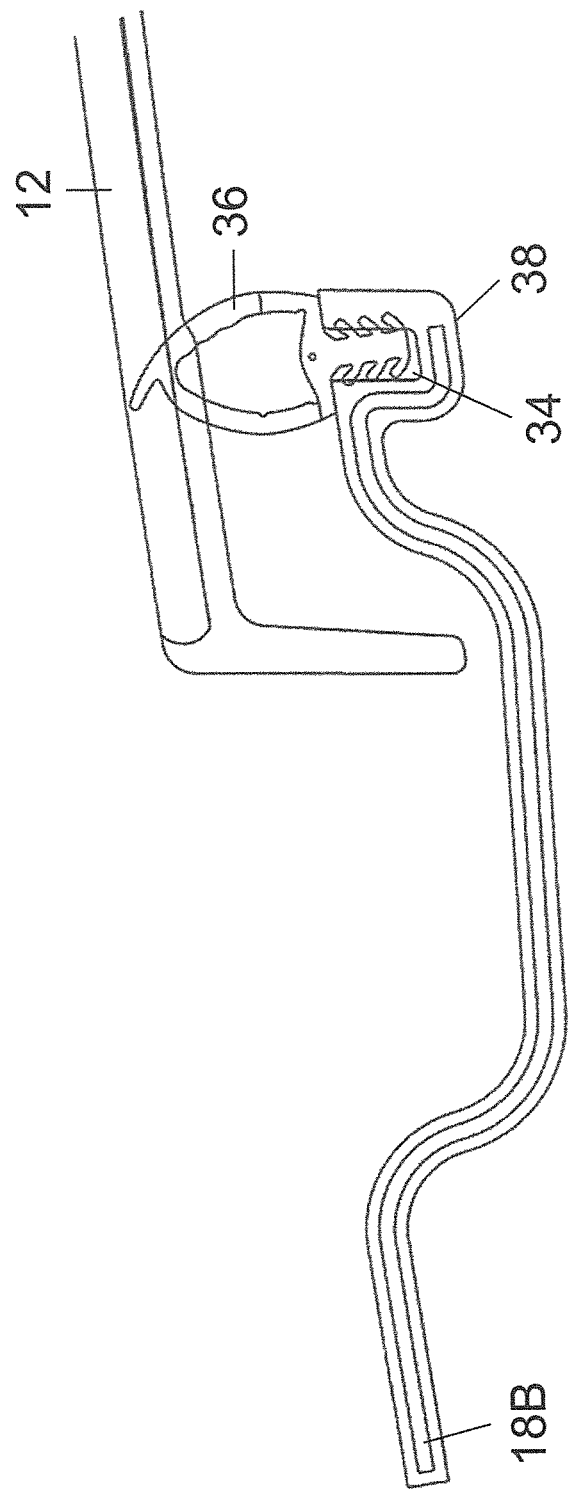
FIG. 5 shows a sectional view of the sliding roof frame along the line V-V in FIG. 2, albeit in conjunction with a displaceable sliding roof element.

As can be seen in FIG. 5, a functional section is formed in the area of each of the longitudinal beams 18A and 18B of the frame 10, said functional section being made of polyurethane foam, which covers the respective longitudinal beam 18A or 18B, made of sheet metal, on both sides. A seal groove 34 is formed at the functional section forming a holding section 38 at the inwardly arranged edge relative to the roof opening 14, said seal groove 34 being a continuation of the seal groove 34 formed at the transverse beam 20 and also receiving the lid seal 36, which is secured continuously around the roof opening 14 at the frame 10.

The glass panel 16 forming the fixed roof section and arranged at the rear of the roof opening 14 is secured via a molding section 40, which is also made of polyurethane foam, on each of its two sides relative to the longitudinal center plane of the roof (FIG. 7). The polyurethane foam, which also forms a holding section for the glass panel 16, extends into a channel formed in the respective longitudinal beam 18A or 18B and secures holding sheets 42 there, via which a not shown corresponding guide track for the lid element 12 can be secured at the frame 10. The polyurethane foam or plastic foam, respectively, of the frame 10 also forms a functional section, which secures the holding sheets 42.

The frame 10 shown in the drawing is produced in the manner described below.

Figure 2:
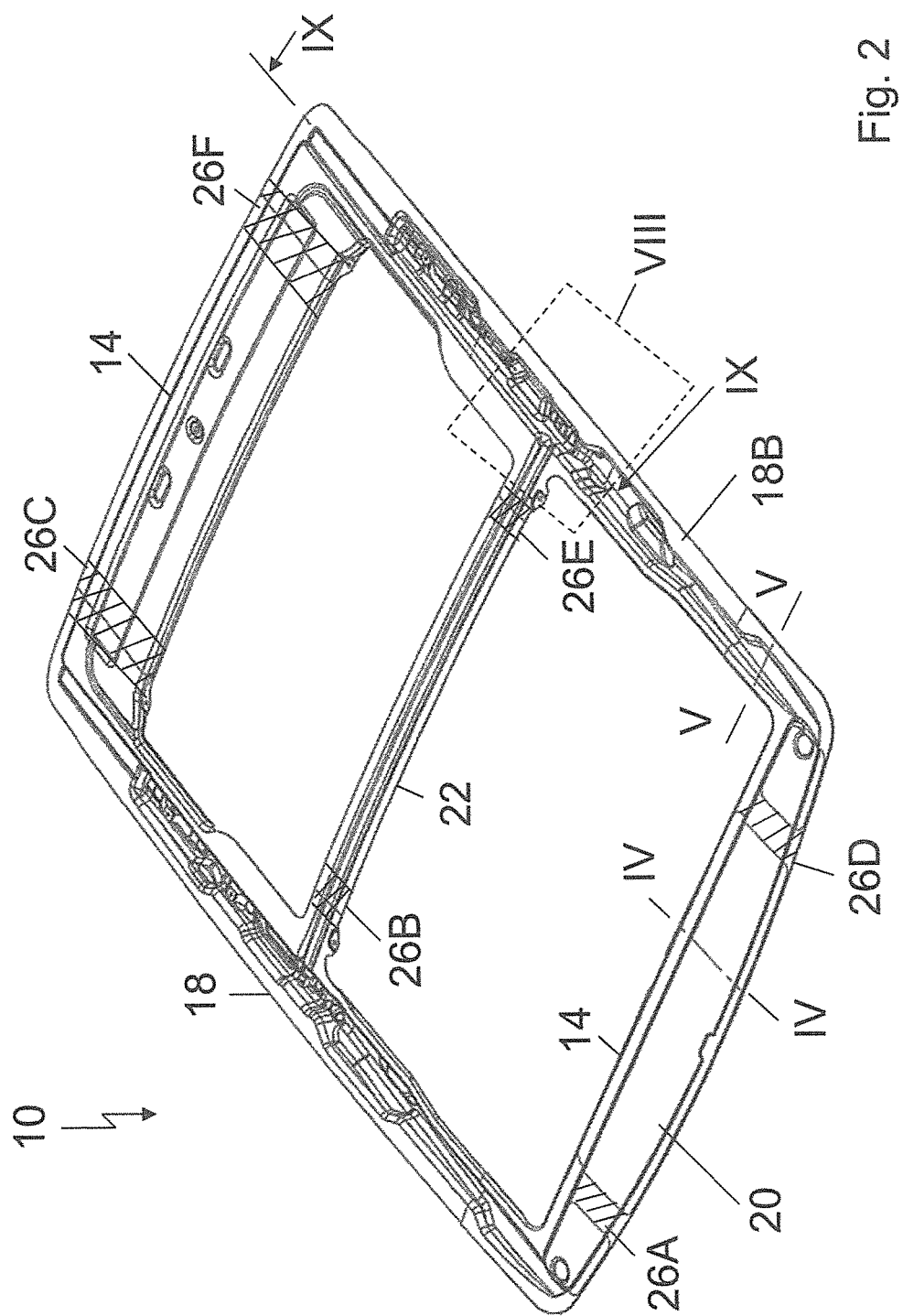
FIG. 2 shows a perspective top view of the sliding roof frame having no glass panel.
Figure 3:
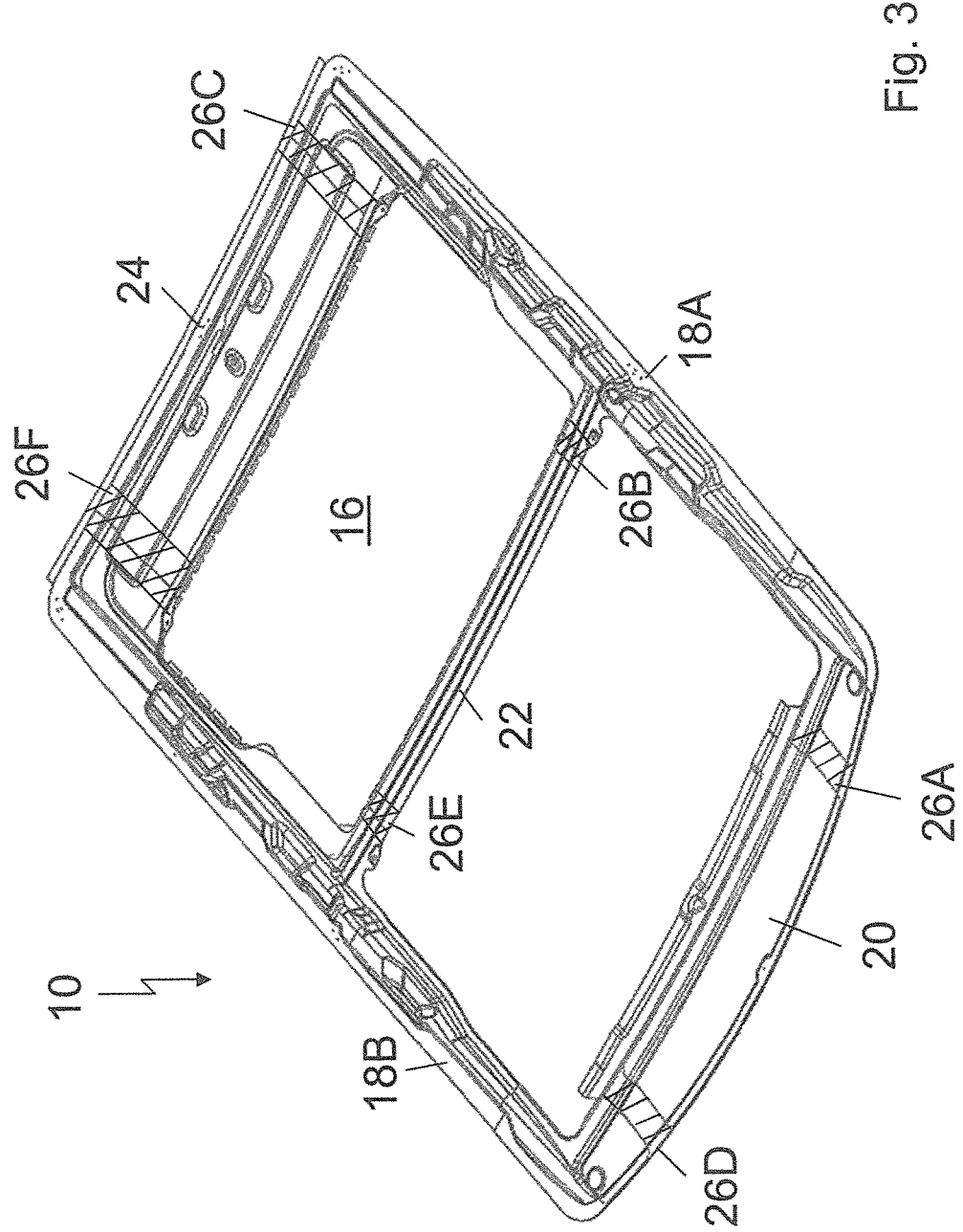
FIG. 3 shows a perspective bottom view of the sliding roof frame having a glass panel.

Initially, the longitudinal beams 18A and 18B as well as the transverse beams 20, 22 and 24 are inserted into a corresponding foaming mold such that they abut against each other via their corresponding abutting lines in the manner shown in FIGS. 2 and 7, respectively. Additionally, the glass panel 16 and the holding sheets 42 are inserted into the foaming mold. Subsequently, the foaming mold is closed in order to form cavities. Then, the foam material consisting of polyurethane is added into the cavities so that the polyurethane coats described above for joining the longitudinal beams 18A and 18B and the transverse beams 20, 22 and 24 as well as the surrounding foam for forming the holding sections 32, 38 and the molding section 40 are formed. After the polyurethane material has fully cured and hardened, the mold is opened and the frame 10, to which the lid element 12 and the holding sheets 42 are secured, is demolded. Subsequently, the lid seal 36 can be inserted into the continuous seal groove 34.

LIST OF REFERENCES 10 frame
12 lid element
14 roof opening
16 glass panel
18A, B longitudinal beam
20 transverse beam
22 transverse beam
24 transverse beam
26A, B, C, D, E, F joining areas
28 abutting line
30 polyurethane coat
32 screen
34 seal groove
36 lid seal
38 holding section
40 molding section
42 holding sheet

The invention claimed is:

1. A vehicle roof comprising a frame, which at least partially surrounds a roof opening, which can be closed or at least partially released as desired by means of a lid element, and/or serves for supporting and fixing a rigid roof panel forming a hard top section, comprising, on each of its two sides relative to a vertical longitudinal center plane of the roof, a respective longitudinal beam made of sheet metal and at least one transverse beam made of sheet metal and connecting the two longitudinal beams to each other, wherein the longitudinal beams and the at least one transverse beam are connected to each other via joint lines made of polyurethane foam.

2. The vehicle roof according to claim 1, wherein it comprises at least one functional section, which is made of polyurethane foam and is connected to at least one of the longitudinal beams and/or the at least one transverse beam.

3. The vehicle roof according to claim 2, wherein the functional section comprises a holding section for a seal of a roof opening system.

4. The vehicle roof according to claim 3, wherein the holding section comprises a seal groove, into which the seal is inserted.

5. The vehicle roof according to claim 2, wherein the functional section secures a reinforcing sheet to at least one of the longitudinal beams and/or the at least one transverse beam.

6. The vehicle roof according to claim 2, wherein the functional section comprises a panel, which is formed on at least one of the longitudinal beams and/or on the at least one transverse beam.

7. The vehicle roof according to claim 1, wherein the vehicle roof comprises at least one visible surface, which is made of a polyurethane foam connected to the transverse beam and/or to at least one of the longitudinal beams.

8. The vehicle roof according to claim 7, wherein the visible surface comprises a grain, which is formed in the polyurethane foam.

9. A vehicle roof comprising a frame, which at least partially surrounds a roof opening, which can be closed or at least partially released as desired by means of a lid element, and/or serves for supporting and fixing a rigid roof panel forming a hard top section, comprising, on each of its two sides relative to a vertical longitudinal center plane of the roof, a respective longitudinal beam made of sheet metal and at least one transverse beam made of sheet metal and connecting the two longitudinal beams to each other, wherein the vehicle roof comprises at least one functional section, which is made of a polyurethane foam and is connected to at least one of the longitudinal beams and/or the transverse beam.

10. The vehicle roof according to claim 9, wherein the functional section comprises a holding section for a seal of roof opening system.

11. The vehicle roof according to claim 10, wherein the holding section comprises a seal groove, into which the seal is inserted.

12. The vehicle roof according to claim 9, wherein the functional section secures a reinforcing sheet to at least one of the longitudinal beams and/or the transverse beam.

13. The vehicle roof according to claim 9, wherein the functional section forms a panel on at least one of the longitudinal beams and/or the transverse beam.

14. The vehicle roof according to claim 13, wherein the vehicle roof comprises a visible surface, which is made of a polyurethane foam connected to at least one of the longitudinal beams and/or the transverse beam.

15. The vehicle roof according to claim 14, wherein the visible surface comprises a grain, which is formed in the polyurethane foam.

16. A vehicle roof comprising a frame, which at least partially surrounds a roof opening, which can be closed or at least partially released as desired by means of a lid element, and/or serves for supporting and fixing a rigid roof panel forming a hard top section, comprising, on each of its two sides relative to a vertical longitudinal center plane of the roof, a respective longitudinal beam made of sheet metal and at least one transverse beam made of sheet metal and connecting the two longitudinal beams to each other, wherein the vehicle roof comprises a visible surface, which is made of a polyurethane foam connected to at least one of the longitudinal beams and/or the transverse beam.

17. The vehicle roof according to claim 16, wherein the visible surface comprises a grain, which is formed in the polyurethane foam.

18. The vehicle roof according to claim 1, characterized by a disk element, which is fixed to the two longitudinal beams via a molding section made of a polyurethane foam.

19. A method for producing a frame of a vehicle roof, which at least partially surrounds a roof opening, which can be closed or at least partially released as desired by means of a lid element, and/or serves for supporting and fixing a rigid roof panel forming a hard top section and which comprises, on each of its two sides relative to a vertical longitudinal center plane of the roof, a respective longitudinal beam made of sheet metal and at least one transverse beam made of sheet metal and connecting the two longitudinal beams to each other, wherein the longitudinal beams and the transverse beam are connected to each other via a polyurethane foam according to a foam molding process and under formation of joint lines.

20. The method according to claim 19, wherein the longitudinal beams and the transverse beam are inserted into a foaming mold, in which the joint lines are formed.

21. The method according to claim 19, wherein a functional section is realized during the foam molding process, said functional section being connected to at least one of the longitudinal beams and/or to the transverse beam.

* * * * *

UNITED STATES PATENT AND TRADEMARK OFFICE
CERTIFICATE OF CORRECTION

PATENT NO. : 10,369,871 B2
APPLICATION NO. : 15/526266
DATED : August 6, 2019
INVENTOR(S) : Dominik Hoelzel Page 1 of 1

It is certified that error appears in the above-identified patent and that said Letters Patent is hereby corrected as shown below:

On the Title Page

Item [30], delete date of the German priority application and insert -- Nov. 21, 2014 -- therefore.

Signed and Sealed this
Twenty-fourth Day of March, 2020

Andrei Iancu
*Director of the United States Patent and Trademark Office*